Sept. 29, 1959 W. T. DOYLE 2,906,665
L-AMPHETAMINE ALGINATE
Filed March 8, 1957 3 Sheets-Sheet 2

INVENTOR.
WILLIAM T. DOYLE
BY Stanley Molder
ATTORNEY.

Sept. 29, 1959 W. T. DOYLE 2,906,665
L-AMPHETAMINE ALGINATE
Filed March 8, 1957 3 Sheets-Sheet 3

INVENTOR.
WILLIAM T. DOYLE
BY Stanley Walder
ATTORNEY.

United States Patent Office 2,906,665
Patented Sept. 29, 1959

2,906,665

L-AMPHETAMINE ALGINATE

William T. Doyle, Livingston, N.J., assignor to Nordson Pharmaceutical Laboratories, Inc., Irvington, N.J., a corporation of New York Application March 8, 1957, Serial No. 644,927

3 Claims. (Cl. 167—55)

The present invention relates to a new molecule of therapeutic importance, namely L-amphetamine alginate.

At the present time various therapeutic agents are known which inhibit appetite and hence are useful in weight reduction regimens. The most commonly employed agents for anorectic purposes are rendered less useful by reason of the fact that they are strong central nervous system stimulants. Their use is accompanied in many instances by objectionable side effects. In many cases it is necessary to administer a sedative such as phenobarbital along with anorectic agent in order to counteract the nervous tension, sleeplessness and other symptoms caused by said agents. In addition, the patient builds up a tolerance to said agents.

The principal problem in obesity is not limited to the reduction of weight but relates to the loss-gain-loss cycle which in itself causes strain which may bring with it a whole host of stress-triggered abnormal conditions. Hence what is needed is an anorectic agent which may be taken over a long period of time to prevent the cyclic gain and loss condition and to assist in establishing permanent eating habits to prevent recurrent obesity.

It is a primary object of the present invention to provide a compound which may be employed to effectively suppress the appetite without the usual central nervous system side effects.

Another object is to provide a novel salt which has improved physical properties over known salts.

Still another object is to provide an anorectic agent which may be employed to assist in establishing permanent dietary habits to prevent recurrent obesity.

A further object is the preparation of the above mentioned new salt in a simple manner whereby a high degree of purity and stability will be assured.

L-amphetamine alginate achieves all these purposes as well as other objects as will be made more apparent from a consideration of the following descriptions and claims.

Method of preparation

L-amphetamine alginate may be formed by the combination of equi-molecular amounts of L-amphetamine and alginic acid, although it may be necessary to add an excess of alginic acid in order to obtain complete conversion of the L-amphetamine to the salt. While, of course, the new salt may be prepared by many methods, a description of the preferred method follows:

L-amphetamine is suspended in 2,500 ml. of distilled water. Alginic acid (800 g. or 5.0 moles, based on a molecular weight of 176) is added to the L-amphetamine suspension in the form of a 25% paste (800 g. in 3,500 ml. of distilled water), with vigorous stirring, to neutralize the base. The stoichiometric amount of alginic acid has been found to be insufficient to neutralize the L-amphetamine, and it may be necessary to add about 176 g. of alginic acid in excess until the solution is neutral to indicator paper. The viscous solution is diluted to five gallons with distilled water to permit adequate stirring.

The final solution, about 90%, is a brownish, opaque, viscous, neutral solution.

After the liquid has been prepared, the fluid is sprayed into a large metal cone and dehydrated by a current of warmed dry air circulating in the cone. The resulting dry powder is then removed. The moist vapor is dried almost instantaneously and the dried material falls as a fine powder.

Alginic acid is a polymeric anhydro β-D-mannuronic acid, having the following chemical structure:

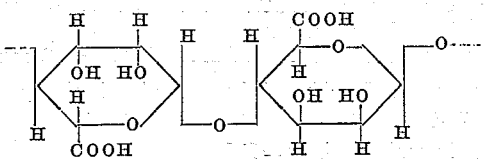

Typically the polymeric molecule consists of a chain of about 80 ring units. Methods of its preparation are well known. Cf. U.S. Patent No. 1,814,981 and Seaweeds and Their Uses, by V. J. Chapman, (Pitman Publishing Corporation, 1949), pp. 193 et seq.

The new salt, as described, may be ground to any fineness required. It is then ready for compounding into various forms and preparations for therapeutic use. For availability, it may be incorporated in the customary excipients such as milk sugar and talc, and made into tablets, each containing 2½ or 5 milligrams as required. Another convenient and desirable form for oral administration is obtained by incorporating the new salt into the coating of the usual form of chewing gum. In such a case, the L-amphetamine alginate is incorporated in the outer layer of the gum.

Physical properties

L-amphetamine alginate is a slightly bitter and odorless coarse or fine powder and yellowish-white in color. It is readily soluble in water and sparingly soluble or insoluble in most organic solvents. It is stable under ordinary storage conditions.

Figure 1:
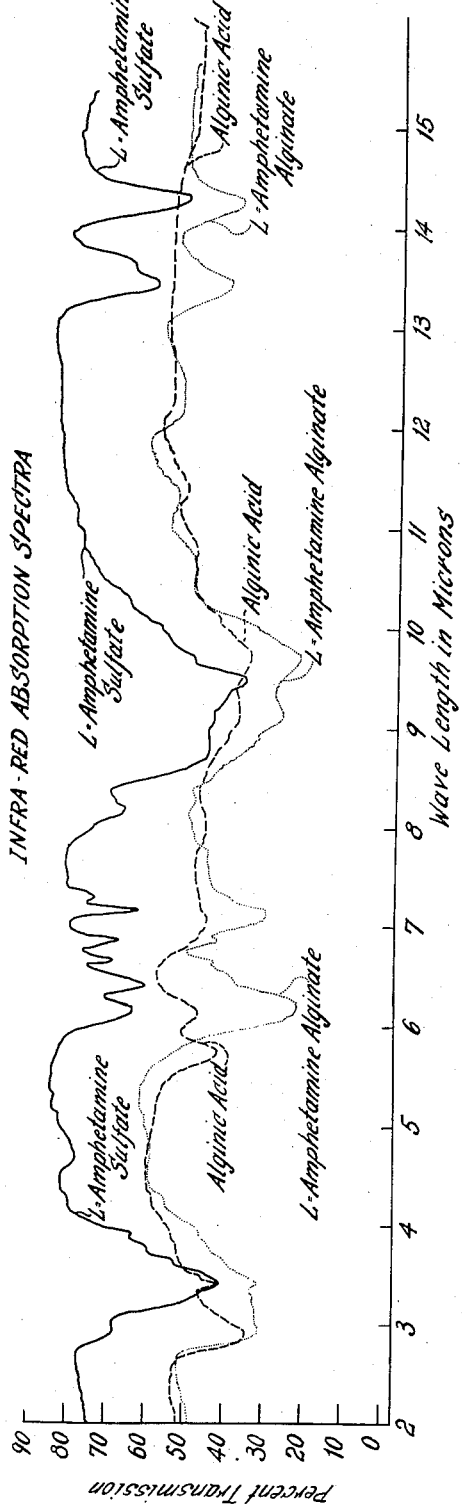
Fig. 1 is a graphic representation of the infra-red absorption spectra of solid state samples of L-amphetamine alginate, alginic acid and L-amphetamine sulfate disbursed in KBr.

As shown clearly by the infra-red absorption spectra set forth in Fig. 1, L-amphetamine alginate is a distinct salt whose infra-red absorption fingerprints set it apart from similar salts and substances containing one or more of its constituent moieties. In the solid state then, L-amphetamine alginate is a well characterized substance. The distinctive infra-red spectra illustrated in Fig. 1 amply demonstrates this.

Figure 2:
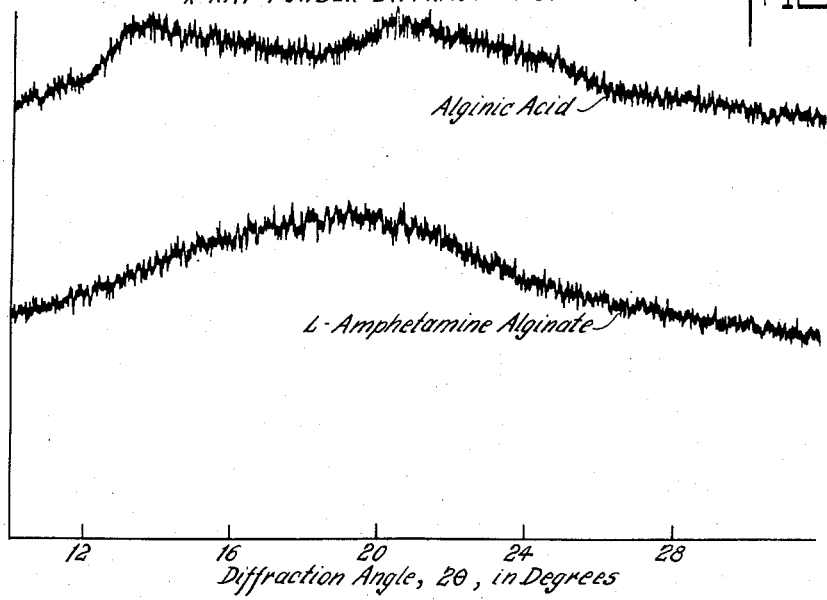
Fig. 2 is a graphic representation of the X-ray powder diffraction spectra of L-amphetamine alginate and alginic acid.

The conclusion is buttressed by the X-ray powder diffraction spectre set forth in Fig. 2. The structure of alginic acid is markedly altered in the formation of the amphetamine salt, as is shown by the change in the X-ray pattern, the same being related to the presence of repeated intra-molecular intervals in the polysaccharide chain. Formation of the salt produces changed foci at intervals along the polysaccharide chain and changes the stereo-chemical conformations relative to the unchanged alginic chains. Although not shown, the X-ray spectra of a mixture of alginic acid and liquid amphetamine is identical with that of alginic acid alone and differs markedly from that of L-amphetamine alginate.

Figure 3:
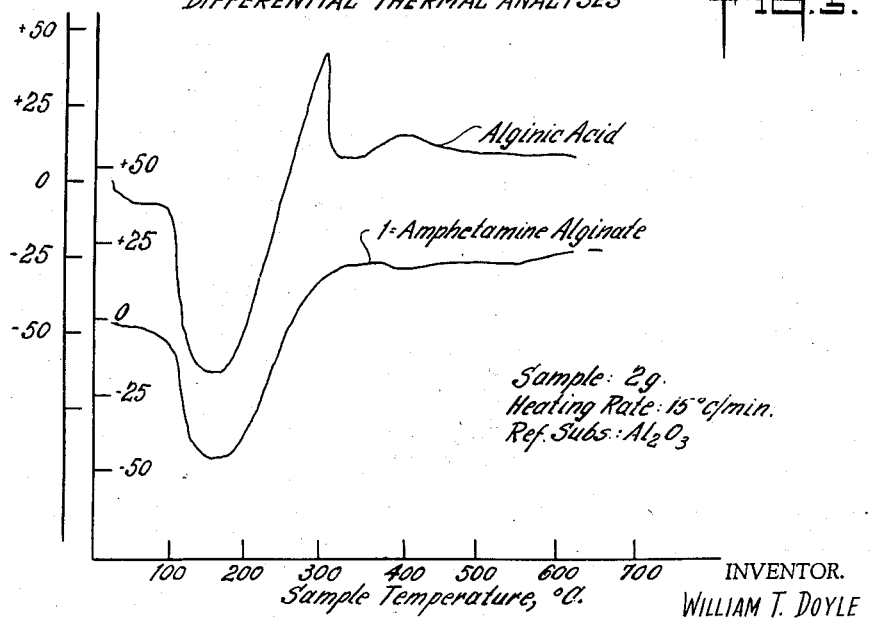
Fig. 3 is a graphic representation of the results of a differential thermal analysis between L-amphetamine alginate and aluminum oxide on the one hand, and alginic acid and aluminum oxide on the other hand, the rate of temperature increase being 15° C. per minute.
Figure 4:
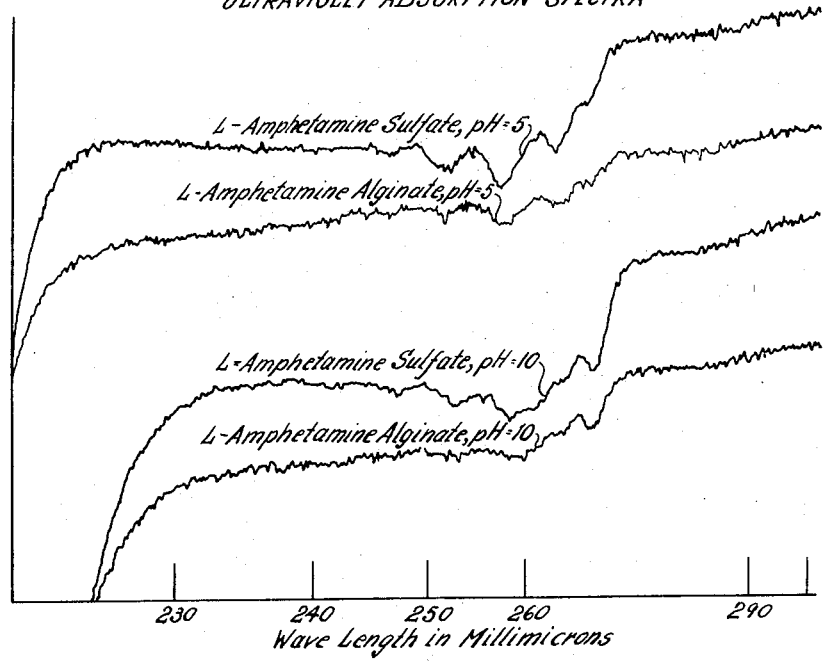
Fig. 4 is a graphic representation of the ultraviolet absorption spectra of L-amphetamine sulfate and L-amphetamine alginate taken at a pH 5 as well as the same compounds taken at a pH 10.

Similarly, the differential thermal analysis curve of L-amphetamine, shown in Fig. 3, is markedly different from the corresponding curve of alginic acid. Note particularly the sharp positive spike which occurs in the alginic acid curve in the low 300's which is absent from the L-amphetamine alginate curve. In solution, L-amphetamine alginate shows properties that are similar to those of L-amphetamine sulfate (see Fig. 4). However, note that even here there is a difference. The height of the step at approximately 207 millimicrons is greater in the case of L-amphetamine sulfate. Also, the curve for L-amphetamine sulfate evidences greater irregularities between 250 and 270 millimicrons. Other differences are apparent. Since L-amphetamine is optically active and since alginic acid is likewise optically active, the result in salt is a diastereoisomer.

Pharmacological and clinical experience

Studies done on mice comparing L-amphetamine alginate with L-amphetamine sulfate indicate that the former has a much lower oral toxicity. As an example, a study to determine the 50% lethal dosage of the two compounds used on mice resulted in the following:

L-amphetamine alginate: oral
    toxicity on mice _____ LD/50=830 mg./kg.
L-amphetamine sulfate: oral
    toxicity on mice _____ LD/50=312 mg./kg.

Another study with a different strain of mice gave the following results:

L-amphetamine alginate=525
    (range=85–117%) _____ (LD/50 mg./kg.)
L-amphetamine sulfate=250
    (range=90–110%) _____ (LD/50 mg./kg.)
d-Amphetamine sulfate=50
    (range=93–108%) _____ (LD/50 mg./kg.)

Human clinical evaluations of the new salt, in which doses of 10 to 40 mgs. per day were administered, evidenced unusually effective results. It would appear that the salt is relatively long acting and smooth in action. An anorectic result was accomplished without the central nervous system or cardiovascular system side effects of the other amphetamine compounds. None of the patients complained of loss of sleep. In fact, when five mg. of L-amphetamine alginate was given as late as eight p.m., no interference with sleep was noted although night hunger was diminished. Another unusual finding was the negligible complaints of constipation while losing weight. Patients who were sensitive to other anorectic agents found that they were not sensitive to this salt. Many commented upon the lack of the problem of constipation and some commented upon the absence of headaches. Uniformly they were pleasantly surprised by the fact that their appetite was controlled without sleeplessness and without side effects.

Therapeutic composition

The clinical work set forth above establishes that the salt may be administered directly without any further active ingredients, as a complete pharmaceutical agent to assist in a weight-reduction regimen by reducing the appetite. As such its effectiveness is heightened by reason of the fact that there is an absence of side effects and the tablets may be taken at any time of the day without causing restlessness, nervous tension or sleeplessness. However, L-amphetamine alginate may be employed with any other pharmaceutical agents to produce highly useful multi-purpose preparations. Examples of such useful forms follow:

Example 1:
    L-amphetamine alginate _____ mg__ 5
    Aspirin _____ gr__ 2½
    Phenacetin _____ gr__ 2½
Example 2:
    L-amphetamine alginate _____ mg__ 2½
    Aspirin _____ gr__ 5
Example 3:
    L-amphetamine alginate _____ mg__ 5
    Sugar and chicle, for candy gum form of
      medication _____ q.s.
Example 4:
    Ergocristine _____ mg__ 1.5
    L-amphetamine alginate _____ mg__ 5.0
Example 5:
    Ergotamine tartrate _____ mg__ 1
    L-amphetamine alginate _____ mg__ 5
Example 6:
    L-amphetamine alginate _____ mg__ 5
    Mephenesin _____ mg__ 250

It is obvious that the above are intended generally to alleviate pain in such conditions as dysmenorrhea, headaches, and other conditions.

Of course the above are merely illustrative and the salt may, of course, be used in numerous other combinations.

It is not desired to be limited except as set forth in the following claims, the above description being by way of illustration of the invention, and what is claimed is:

1. L-amphetamine alginate.
2. A therapeutic composition comprising as the active agent the L-amphetamine salt of alginic acid.
3. A composition in dosage form for controlling the appetite, including not less than 2½ mgs. of L-amphetamine alginate.

References Cited in the file of this patent

UNITED STATES PATENTS

| | | |
|---|---|---|
| 2,158,486 | Preble _____ | May 16, 1939 |
| 2,536,168 | Goggin _____ | Jan. 2, 1951 |
| 2,748,052 | Rosner _____ | May 29, 1956 |

OTHER REFERENCES

"Jour. Am. Pharm. Assoc.," Prac. Pharm. Ed., December 1955, vol. 16, No. 12, p. 762.